United States Patent
Molter et al.

(10) Patent No.: US 7,354,675 B2
(45) Date of Patent: Apr. 8, 2008

(54) APPARATUS AND METHOD FOR MAINTAINING COMPRESSION OF THE ACTIVE AREA IN AN ELECTROCHEMICAL CELL

(75) Inventors: Trent M. Molter, Glastonbury, CT (US); Lawrence C. Moulthrop, Jr., Windsor, CT (US); Jason K. Shiepe, Middletown, CT (US); A. John Speranza, West Hartford, CT (US); Robert H. Byron, Jr., Glastonbury, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 1140 days.

(21) Appl. No.: 09/965,679

(22) Filed: Sep. 27, 2001

(65) Prior Publication Data

US 2003/0104263 A1 Jun. 5, 2003

Related U.S. Application Data (63) Continuation of application No. 09/413,782, filed on Oct. 7, 1999, now Pat. No. 6,365,032.

(60) Provisional application No. 60/235,872, filed on Sep. 27, 2000, provisional application No. 60/235,629, filed on Sep. 27, 2000, provisional application No. 60/235,871, filed on Sep. 27, 2000.

(51) Int. Cl.
*H01M 4/00* (2006.01)
(52) U.S. Cl. .................................. 429/37; 205/125
(58) Field of Classification Search ........... 205/125, 205/128, 129, 137, 157; 429/34, 12, 26, 429/37, 30, 32
See application file for complete search history.

(56) References Cited

U.S. PATENT DOCUMENTS 1,769,066 A * 7/1930 McKnight ...................... 38/63
3,656,027 A   4/1972 Isley (Continued)

FOREIGN PATENT DOCUMENTS

DE   200 08 539   4/2000

(Continued)

OTHER PUBLICATIONS

International Search Report. Mailing Date Nov. 10, 2002. 7 pages.

(Continued)

*Primary Examiner*—Patrick Joseph Ryan
*Assistant Examiner*—Monique Wills
(74) *Attorney, Agent, or Firm*—Cantor Colburn LLP (57) ABSTRACT

An electrochemical cell includes a first electrode, a second electrode, a proton exchange membrane disposed between and in intimate contact with the electrodes, and a pressure pad disposed in electrical communication with the first electrode. The pressure pad is an electrically conductive sheet and is of a structure that is conformable to pressure variations within the cell. Methods of forming the pressure pad include disposing dimples or corrugations at the electrically conductive member. A method of maintaining compression within the cell includes disposing the electrically conductive member and the compression member at the first electrode, applying a load at the cell to compress the cell components, and maintaining electrical communication through the electrically conductive member.

11 Claims, 7 Drawing Sheets

U.S. PATENT DOCUMENTS

| | | | |
|---|---|---|---|
| 4,011,360 A | 3/1977 | Walsh | |
| 4,225,654 A | 9/1980 | Tajima et al. | 429/34 |
| 4,317,864 A | 3/1982 | Strasser | 429/36 |
| 4,485,138 A * | 11/1984 | Yamamoto et al. | 428/131 |
| 4,488,203 A | 12/1984 | Muranaka et al. | |
| 4,732,660 A | 3/1988 | Plowman et al. | 204/265 |
| 4,745,301 A | 5/1988 | Michalchik | |
| 4,844,922 A | 7/1989 | Strasser | 429/34 |
| 4,912,286 A | 3/1990 | Clarke | 174/110 A |
| 5,009,968 A | 4/1991 | Guthrie et al. | 429/26 |
| 5,082,596 A | 1/1992 | Fukuda et al. | |
| 5,250,372 A * | 10/1993 | Willmann et al. | 429/146 |
| 5,281,496 A | 1/1994 | Clarke | 429/218 |
| 5,296,570 A | 3/1994 | Earls et al. | |
| 5,324,565 A * | 6/1994 | Leonida et al. | 428/131 |
| 5,366,823 A | 11/1994 | Leonida et al. | 429/34 |
| 5,466,354 A | 11/1995 | Leonida et al. | 304/252 |
| 5,472,801 A | 12/1995 | Mattejat et al. | 429/39 |
| 5,498,644 A | 3/1996 | Reo | |
| 5,547,777 A | 8/1996 | Richards | 429/32 |
| 5,580,672 A | 12/1996 | Zagaja, III et al. | 204/265 |
| 5,585,038 A | 12/1996 | Kirmanen et al. | |
| 5,624,277 A * | 4/1997 | Ward | 439/620 |
| 5,656,690 A | 8/1997 | Pradl et al. | |
| 5,686,200 A | 11/1997 | Barton et al. | |
| 5,824,199 A | 10/1998 | Simmons et al. | 204/265 |
| 5,942,350 A | 8/1999 | Roy et al. | 429/38 |
| 6,096,450 A | 8/2000 | Walsh | 429/34 |
| 6,171,719 B1 | 1/2001 | Roy et al. | 429/39 |
| 6,231,053 B1 * | 5/2001 | Wakamatsu | 277/628 |
| 6,296,907 B1 * | 10/2001 | Viksne | 427/387 |
| 6,322,684 B1 * | 11/2001 | Hodko et al. | 205/125 |
| 6,365,032 B1 | 4/2002 | Shiepe et al. | 205/338 |
| 6,464,846 B1 | 10/2002 | Titterington | |
| 6,500,319 B2 | 12/2002 | LaConti et al. | |
| 6,585,869 B2 | 7/2003 | Shiepe et al. | |
| 6,663,996 B2 | 12/2003 | Gibb et al. | |
| 6,682,845 B2 | 1/2004 | Shiepe et al. | |
| 6,828,056 B2 | 12/2004 | Molter et al. | |
| 2001/0013469 A1 | 8/2001 | Shiepe et al. | 204/252 |
| 2002/0022173 A1 | 2/2002 | Molter et al. | 429/37 |

FOREIGN PATENT DOCUMENTS

| | | | |
|---|---|---|---|
| GB | 966407 | | 8/1964 |
| JP | 2160371 | | 6/1990 |
| JP | 02245579 | * | 10/1990 |
| JP | 5101836 | | 4/1993 |
| JP | 5166523 | | 7/1993 |
| JP | 58164170 | | 9/1993 |
| WO | WO 98/23794 | | 6/1998 |
| WO | WO 98/40537 | | 9/1998 |
| WO | WO 98/57384 | | 12/1998 |
| WO | WO 99/27599 | | 6/1999 |
| WO | WO 00/39362 | | 7/2000 |
| WO | WO 02/50339 A1 | | 6/2002 |

OTHER PUBLICATIONS

T.G. Coker, et al.—"Industrial and Government Applications of SPE Fuel Cell and Electrolyzers", The Case western Symposium, May 17-19, 1982, Cleveland, Ohio, 23 pages.

English Translation of JP 10162842 *Abstract Only* (Japan), 1 page.
English Translation of JP 02160371 *Abstract Only* (Japan), 1 page.
English Translation of JP 05166523 *Abstract Only* (Japan), 1 page.
English Translation of JP 58164170 *Abstract Only* (Japan), 1 page.
English Translation of JP 05101838 *Abstract Only* (Japan), 1 page.
International Search Report, International Application No. PCT/US01/30207; International Filing Date: Sep. 27, 2001, 7 pages.
International Search Report, International Application No. PCT/US01/30251; International Filing Date: Sep. 27, 2001.
"Conductive Ceramic Technology", The Ebonix Company, http://www.netcontex.com/atraverda/index.htm; Jan. 15, 2002, 11 pages.
Ebonex Patent Abstracts; pp. 1-22.

* cited by examiner

APPARATUS AND METHOD FOR MAINTAINING COMPRESSION OF THE ACTIVE AREA IN AN ELECTROCHEMICAL CELL

CROSS REFERENCE TO RELATED APPLICATIONS

This application which is a continuation-in-part of Ser. No. 09/413,782, filed Oct. 7, 1999 now U.S. Pat. No. 6,365,032 B1, issued Apr. 2, 2002, and claims the benefits of U.S. Provisional Patent Application Ser. No. 60/235,872 filed Sep. 27, 2000, U.S. Provisional Patent Application Ser. No. 60/235,629 filed Sep. 27, 2000, and U.S. Provisional Patent Application Ser. No. 60/235,871 filed Sep. 27, 2000, the entire contents of all three applications being incorporated herein by reference.

BACKGROUND

This disclosure relates to electrochemical cells, and, more particularly, to an apparatus for maintaining compression within the active area of an electrochemical cell.

Figure 1:
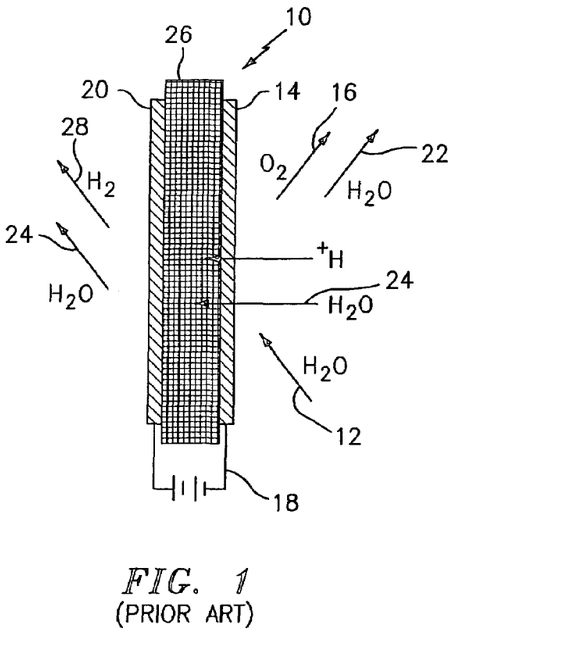
FIG. 1 is a schematic representation of a conventional anode feed electrolysis cell.

Electrochemical cells are energy conversion devices that are usually classified as either electrolysis cells or fuel cells. Proton exchange membrane electrolysis cells can function as hydrogen generators by electrolytically decomposing water to produce hydrogen and oxygen gases. Referring to FIG. 1, an anode feed electrolysis cell is shown at 10 and is hereinafter referred to as "cell 10." Reactant water 12 is fed to cell 10 at an oxygen electrode (e.g., an anode) 14 where a chemical reaction occurs to form oxygen gas 16, electrons, and hydrogen ions (protons). The chemical reaction is facilitated by the positive terminal of a power source 18 connected to anode 14 and a negative terminal of power source 18 connected to a hydrogen electrode (e.g., a cathode) 20. Oxygen gas 16 and a first portion 22 of the water are discharged from cell 10, while the protons and a second portion 24 of the water migrate across a proton exchange membrane 26 to cathode 20. At cathode 20, hydrogen gas 28 is formed and is removed for use as a fuel. Second portion 24 of water, which is entrained with hydrogen gas, is also removed from cathode 20.

Another type of water electrolysis cell that utilizes the same configuration as is shown in FIG. 1 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the cell at the cathode side without passing through the membrane.

A typical fuel cell also utilizes the same general configuration as is shown in FIG. 1. Hydrogen gas is introduced to the hydrogen electrode (the anode in the fuel cell), while oxygen, or an oxygen-containing gas such as air, is introduced to the oxygen electrode (the cathode in the fuel cell). The hydrogen gas for fuel cell operation can originate from a pure hydrogen source, a hydrocarbon, methanol, or any other source that supplies hydrogen at a purity level suitable for fuel cell operation. Hydrogen gas electrochemically reacts at the anode to produce protons and electrons, the electrons flow from the anode through an electrically connected external load, and the protons migrate through the membrane to the cathode. At the cathode, the protons and electrons react with oxygen to form water.

Conventional electrochemical cell systems generally include one or more individual cells arranged in a stack, with the working fluids directed through the cells via input and output conduits formed within the stack structure. The cells within the stack are sequentially arranged, each including a membrane electrode assembly (hereinafter "MEA") defined by a cathode, a proton exchange membrane, and an anode. Each cell typically further comprises a first flow field in fluid communication with the cathode and a second flow field in fluid communication with the anode. The MEA may be supported on either one side or both sides by flow field support members such as screen packs or bipolar plates disposed within the flow fields, and which may be configured to facilitate membrane hydration and/or fluid movement to and from the MEA.

Figure 2:
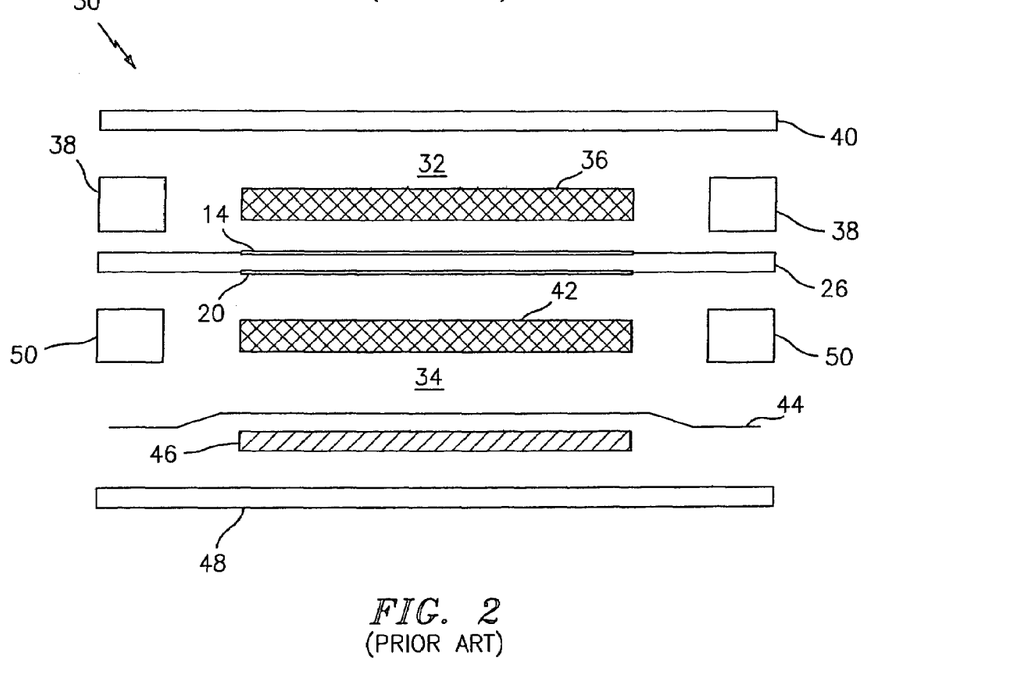
FIG. 2 is a cross sectional schematic representation of a conventional electrochemical cell system showing the spatial relationship of the cell components.

Referring to FIG. 2, a conventional electrochemical cell system suitable for operation as an anode feed electrolysis cell, a cathode feed electrolysis cell, or a fuel cell is shown at 30 and is hereinafter referred to as "cell system 30." Cell system 30 includes the MEA defined by anode 14, cathode 20, and proton exchange membrane 26. Regions proximate to and bounded on at least one side by anode 14 and cathode 20 respectively define flow fields 32, 34. A flow field support member 36 is disposed adjacent to anode 14 and is retained within flow field 32 by a frame 38 and a cell separator plate 40. A flow field support member 42 is disposed adjacent to cathode 20 and is retained within flow field 34 by a frame 50 and a pressure pad separator plate 44. A pressure pad 46 is disposed between pressure pad separator plate 44 and a cell separator plate 48. The cell components, particularly frames 38, 50 and cell separator plates 40, 48, are formed with the suitable manifolds or other conduits to facilitate fluid communication through cell system 30.

A pressure differential often exists within the cell system and particularly across the cell. Such a pressure differential may cause variations in the pressure distribution over the surface area of the MEA. In order to compensate for the pressure differential and while maintaining intimate contact between the various cell components under a variety of operational conditions and over long time periods, compression is applied to the cell components via pressure pad 46. However, because pressure pad 46 is generally fabricated from materials incompatible with system fluids and/or the material from which the cell membrane is fabricated, pressure pad 46 is oftentimes separated from the active area of the cell by pressure pad separator plate 44 and/or enclosed within protective casings (not shown).

While existing pressure pads are suitable for their intended purposes, there still remains a need for improvements, particularly regarding the compression of the components in the electrolysis cell and support of the MEA, particularly at high pressures. Therefore, a need exists for a pressure pad that is compatible with the cell environment, and that provides uniform compression of the cell components and support of the MEA, thereby allowing for the optimum performance of the electrolysis cell.

SUMMARY

The above-described drawbacks and disadvantages are alleviated by an electrochemical cell comprising a first electrode, a second electrode, a proton exchange membrane disposed between and in intimate contact with the electrodes, and a pressure pad disposed in electrical communication with the first electrode. The pressure pad is an electrically conductive sheet and is of a structure that is conformable to pressure variations within the cell. Methods of forming the pressure pad include disposing dimples or corrugations at the electrically conductive member, and optionally incorporating an elastomeric material into the electrically conductive member. A method of maintaining compression within the cell includes disposing the electrically conductive member and optionally the elastomeric member at the first electrode, applying a load to compress the cell components, and maintaining electrical communication through the electrically conductive member.

The above discussed and other features and advantages will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

Disclosed herein is a novel apparatus and methods for maintaining the compression of the active area in an electrochemical cell. The active area generally refers to electrically associated electrodes and to the space between two or more electrically associated electrodes of the cell. A compression device, e.g., a pressure pad as is described below, is disposed at the cell proximate to one of the electrodes. Other compression devices may further be disposed proximate to the other electrodes. The pressure pad, which comprises an electrically conductive material that may be made integral with an elastomeric material selected for its compatibility with the cell environment, is typically disposed at a flow field adjacent to the electrode where it is exposed to the system fluids.

Although the disclosure below is described in relation to a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, and iodine. Upon the application of different reactants and/or different electrolytes, the flows and reactions change accordingly, as is commonly understood in relation to that particular type of electrochemical cell. Furthermore, while the discussion below is directed to an anode feed electrolysis cell, it should be understood by those of skill in the art that cathode feed electrolysis cells, fuel cells, and regenerative fuel cells are also within the scope of the embodiments disclosed.

Figure 3:
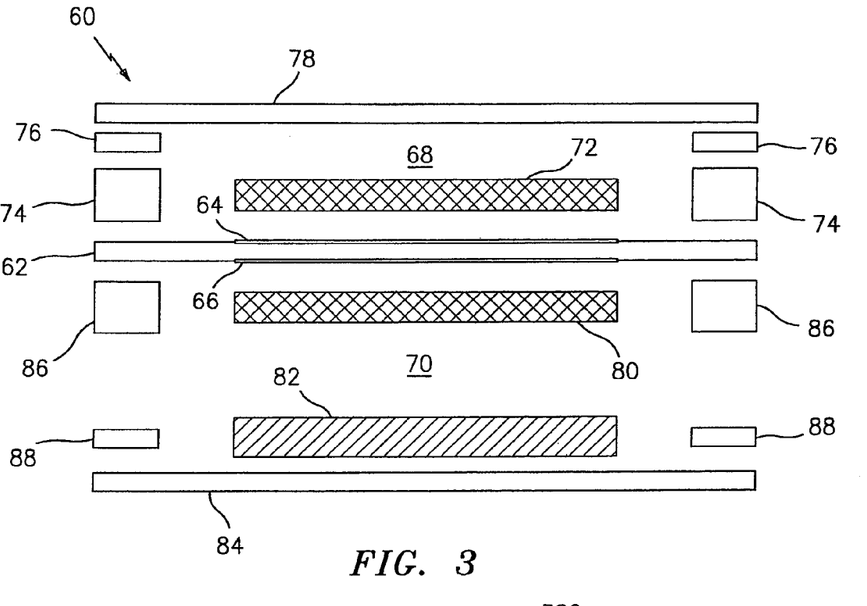
FIG. 3 is a cross sectional schematic representation of an electrochemical cell system showing the spatial relationship of the cell components and a pressure pad.

Referring to FIG. 3, an electrochemical cell system incorporating an exemplary embodiment of a pressure pad capable of providing improved compression in the active area of the cell is shown at 60. Cell system 60 typically includes a plurality of cells employed in a stack as part of the cell system. When cell system 60 is utilized as an electrolysis cell, power inputs are generally from about 1.48 volts to about 3.0 volts, with current densities being from about 50 $A/ft^2$ (amperes per square foot) to about 4,000 $A/ft^2$. When utilized as a fuel cell, power outputs range from about 0.4 volts to about 1 volt, with current densities being from about 0.1 $A/ft^2$ to about 10,000 $A/ft^2$. Current densities exceeding 10,000 $A/ft^2$ may also be obtained depending upon the fuel cell dimensions and configuration. The number of cells within the stack and the dimensions of the individual cells is scalable to the cell power output and/or gas output requirements.

Cell system 60 is substantially similar to cell system 30 as described above and shown with reference to FIG. 2. In particular, cell system 60 comprises an MEA defined by a proton exchange membrane 62 having a first electrode (e.g., an anode) 64 and a second electrode (e.g., a cathode) 66 disposed on opposing sides thereof. Regions proximate to and bounded on at least one side by anode 64 and cathode 66 respectively define flow fields 68, 70. A flow field support member 72 may be disposed adjacent to anode 64 and retained within flow field 68 by a frame 74 and a cell separator plate 78. A gasket 76 is optionally positioned between frame 74 and cell separator plate 78 to effectively seal flow field 68.

A flow field support member 80 may be disposed adjacent to cathode 66. A pressure pad 82 is typically disposed between flow field support member 80 and a cell separator plate 84. Flow field support member 80 and pressure pad 82 are retained within flow field 70 by a frame 86 and cell separator plate 84. Because pressure pad 82 is preferably fabricated from materials that are compatible with the cell environment, cell system 60 is generally operated without a pressure pad separator plate. A gasket 88 is optionally positioned between frame 86 and cell separator plate 84 to effectively seal flow field 70. The cell components, particularly frames 74, 86, cell separator plates 78, 84, and gaskets 76, 88, are formed with the suitable manifolds or other conduits to facilitate fluid communication through cell system 60.

Membrane 62 comprises electrolytes that are preferably solids or gels under the operating conditions of the electrochemical cell. Useful materials from which membrane 62 can be fabricated include proton conducting ionomers and ion exchange resins. Useful proton conducting ionomers include complexes comprising an alkali metal salt, an alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid, are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids, and bases. One family of fluorocarbon-type resins having sulfonic acid group functionality is NAFION™ resins (commercially available from E.I. du Pont de Nemours and Company, Wilmington, Del.).

Anode 64 and cathode 66 are fabricated from catalyst materials suitable for performing the needed electrochemical reaction (i.e., electrolyzing water to produce hydrogen and oxygen). Suitable materials for anode 64 and cathode 66 include, but are not limited to, platinum, palladium, rhodium, carbon, gold, tantalum, tungsten, ruthenium, iridium, osmium, alloys thereof, and the like. Anode 64 and cathode 66 may be adhesively disposed on membrane 62, or may be positioned adjacent to, but in contact with, membrane 62.

Flow field support members 72, 80 allow the passage of system fluids and are preferably electrically conductive. Such support members 72, 80 may comprise, for example, screen packs or bipolar plates. Screen packs include one or more layers of perforated sheets or a woven mesh formed from metal strands. Typical metals that may be used to fabricate screen packs include, but are not limited to, niobium, zirconium, tantalum, titanium, carbon steel, stainless steel, nickel, cobalt, and alloys thereof. Bipolar plates are commonly carbon or carbon composite structures incorporating a polymeric binder. Bipolar plates may also be fabricated from metal. Typical metals that may be used to fabricate bipolar plates include, but are not limited to, niobium, zirconium, tantalum, titanium, carbon steel, stainless steel, nickel, cobalt, and alloys thereof Improved compression is maintained in cell system 60 via pressure pad 82. Pressure pad 82 is disposed in direct contact with flow field 70 and is positioned adjacent to the cell separator plate on either the anode or the cathode side of membrane 62. Furthermore, it should be understood that pressure pads 82 may be disposed on both sides of membrane 62, and that pressure pad 82 may be positioned within either or both of the flow fields of cell system 60 in place of either or both of the flow field support members.

An exemplary embodiment of pressure pad 82 comprises an electrically conductive material configured to provide for the even distribution of compression within the cell. Suitable electrically conductive materials include, but are not limited to, conductive metals and alloys and superalloys thereof, for example copper; silver; gold; chromium; zirconium; tantalum; titanium; niobium; iron and iron alloys, for example steels such as stainless steel; nickel and nickel alloys such as HASTELLOY™ (commercially available from Haynes International, Kokomo, Ind.); cobalt and cobalt superalloys such as ELGILOY™ (commercially available from Elgiloy® Limited Partnership, Elgin, Ill.) and MP35N™ (commercially available from Maryland Specialty Wire, Inc., Rye, N.Y.); hafnium; and tungsten, among others, with titanium preferred because of its strength, durability, availability, low cost, ductility, low density, and its compatibility with the electrochemical cell environment. Other materials that can be utilized include, but are not limited to, electrically conductive carbon, electrically conductive polymers, and mixtures of the foregoing materials.

To assist in providing for the even distribution of compression, pressure pad 82 may further comprise an elastomeric material. Suitable elastomeric materials include, but are not limited to silicones, such as, for example, fluorosilicones; fluoroelastomers, such as KALREZ® (commercially available from E.I. du Pont de Nemours and Company), VITON® (commercially available from E.I. du Pont de Nemours and Company), and FLUOREL® (commercially available from Minnesota Mining and Manufacturing Company, St. Paul, Minn.); and combinations thereof.

The elastomeric materials may themselves be made conductive, typically by the incorporation of electrically conductive particulate materials as is known in the art. Suitable electrically conductive particulate materials include, but are not limited to, the above-mentioned electrically conductive metals and alloys and superalloys thereof, preferably copper and nickel. Also useful are non-conductive particles coated with conductive materials, for example silver-coated glass spheres, as well as conductive, particulate carbon, for example acetylene blacks, conductive furnace black, superconductive furnace black, extra-conductive furnace black, vapor grown carbon fibers, carbon nanotubes, and the like. Copper, nickel, conductive carbon, or a combination thereof is presently preferred because of their conductivity, availability, low cost, and compatibility with the electrochemical cell environment. The particular shape of the particles is not critical, and includes spheres, plates, whiskers, tubes, drawn wires, flakes, short fibers, irregularly-shaped particles, and the like. Suitable particle sizes and amounts vary widely, and are readily determined by one of ordinary skill in the art depending on factors including, but not limited to, the particular materials chosen, the desired elastomeric characteristics and conductivity of the pressure pad, the cost of the materials, the size of the pressure pad, the method of manufacture, and other considerations. Regardless of the exact size, shape, and composition of the conductive fillers particles, they should be thoroughly dispersed through the polymeric resin. Such compositions and their method of manufacture have been described, for example, in U.S. Pat. Nos. 4,011,360; 5,082,596; 5,296,570; 5,498,644; 5,585,038; and 5,656,690.

Both the electrically conductive material and the elastomeric material are preferably compatible with the system fluids and the material from which membrane 62 is fabricated. Pressure pad 82 is optionally porous to allow passage of water or system gases and is capable of allowing intimate contact to be maintained between cell components at high pressures. Pressure pad 82 is configured to withstand high pressures while maintaining its operability over extended time periods. In particular, pressure pad 82 is configured to withstand pressures up to or exceeding about 100 pounds per square inch (psi), 250 psi, 500 psi, 2000 psi, 5000 psi, and more preferably about 10,000 psi. Pressure pad 82 may be configured and dimensioned to withstand pressures exceeding 10,000 psi.

Figure 4A:
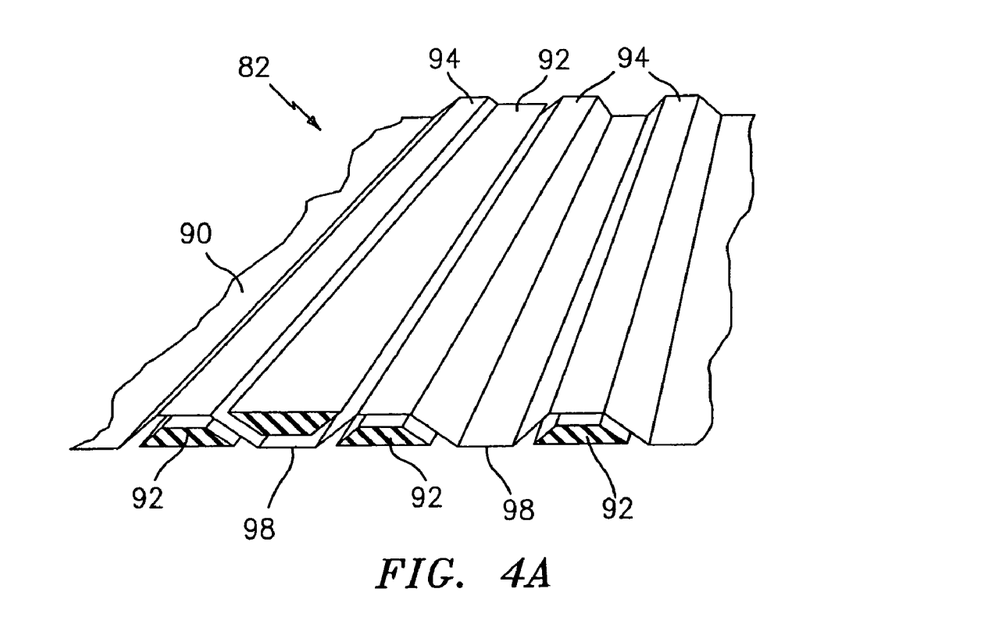
FIG. 4A is a perspective view of a section of a corrugated pressure pad having elastomeric members disposed between the corrugations.
Figure 4B:
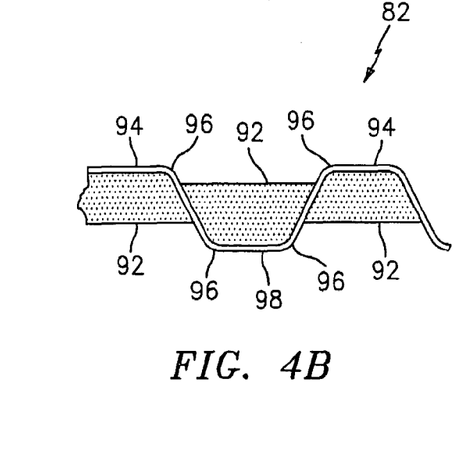
FIG. 4B is a side sectional view of a section of a corrugated pressure pad having elastomeric members disposed between the corrugations.

One exemplary embodiment of pressure pad 82 is shown in FIGS. 4A and 4B. Pressure pad 82 comprises an electrically conductive corrugated sheet 90 onto which an elastomeric member 92 is disposed. If incorporated into the design of a cell in which a pressure pad separator plate is not one of the components, then surfaces of corrugated sheet 90 are exposed to facilitate electrical communication between pressure pad 82 and the adjacently positioned structure of the cell. Opposing raised portions 94 of corrugated sheet 90 form "peaks" that define such exposed surfaces. Depressed portions 98 intermediate raised portions 94 form "troughs." Corrugated sheet 90 is generally formed such that the lengthwise edges of raised portions 94 include curved surfaces 96 defined by a slight radius (as can be in FIG. 4B) to inhibit the crumpling or deformation of pressure pad 82 when pressure pad 82 is compressed during operation of the cell. Corrugated sheet 90 may be formed by stamping, casting, machining, or other known techniques.

Elastomeric members 92 may be disposed at depressed portions 98 by any one of a variety of means. One exemplary means entails disposing stock elastomeric material between raised portions 94, subsequently melting the elastomeric material such that the troughs formed by depressed portions 98 of corrugated sheet 90 are substantially filled with molten elastomeric material, and hardening the molten elastomeric material. The stock elastomeric material typically includes agents to sufficiently enable elastomeric members 92 to adhere to corrugated sheet 90. The amount of hardened elastomeric material disposed at depressed portions 98 should be such that raised portions 94 in the finished pressure pad 82 remain exposed to ensure that electrical contact is maintained between pressure pad 82 and the adjacent structure. Another exemplary means of disposing elastomeric material at the surface of corrugated sheet 90 involves the injection molding of quantities of the material around corrugated sheet 90 as corrugated sheet 90 is positioned within a mold (not shown).

When disposed within the cell structure, pressure pad 82 is typically supported by the cell separator plate at one face and by either the flow field support member or an electrode at an opposing face. Because of the corrugated structure of pressure pad 82, forces applied normal to the faces cause pressure pad 82 to elastically deform in directions orthogonal to the applied forces. Further, because of the corrugated structure, pressure pad 82 is able to flex and to conform to variations in the pressure applied by the supporting cell separator plate and either the flow field support member or the electrode, thereby enabling electrical communication to be maintained across pressure pad 82.

Figure 5:
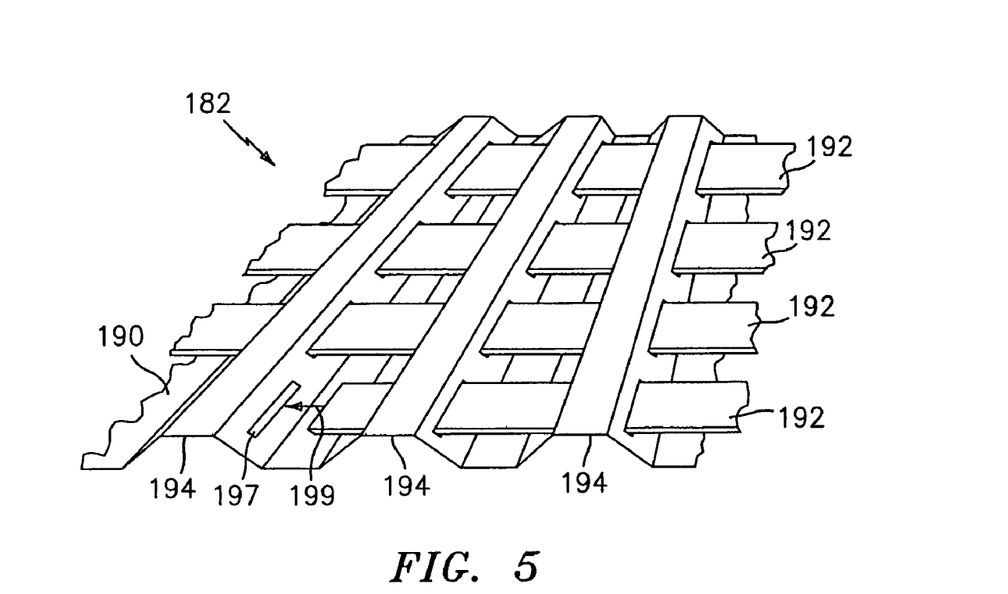
FIG. 5 is a perspective view of a section of a corrugated pressure pad having elastomeric members threaded through the corrugations.

Another exemplary embodiment of a pressure pad configured to maintain compression in the active area of an electrochemical cell is shown generally at 182 in FIG. 5. Pressure pad 182 comprises a corrugated sheet 190 in which is disposed a plurality of openings 197. Openings 197 are configured, positioned, and dimensioned to facilitate the threading of elastomeric members 192 therethrough in a direction as indicated by an arrow 199. Elastomeric members 192 threaded through openings 197 impart a torsional resilience to pressure pad 182, thereby allowing compression to be maintained in the cell into which pressure pad 182 is incorporated. Electrical communication is maintained between pressure pad 182 and the adjacently positioned structure of the cell system via raised portions 194.

Figure 6A:
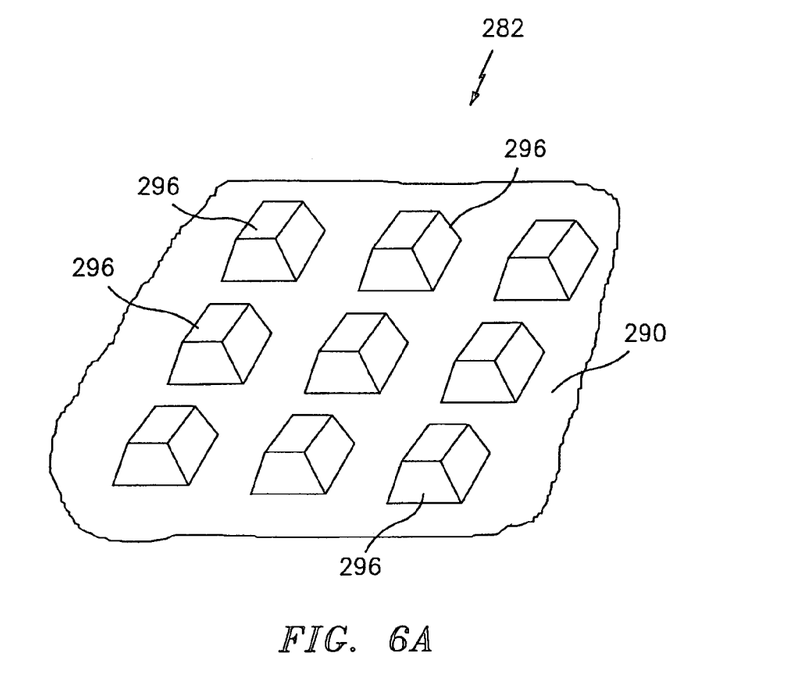
FIG. 6A is a perspective view of a section of a pressure pad having frusto-pyramidically shaped dimples.
Figure 6B:
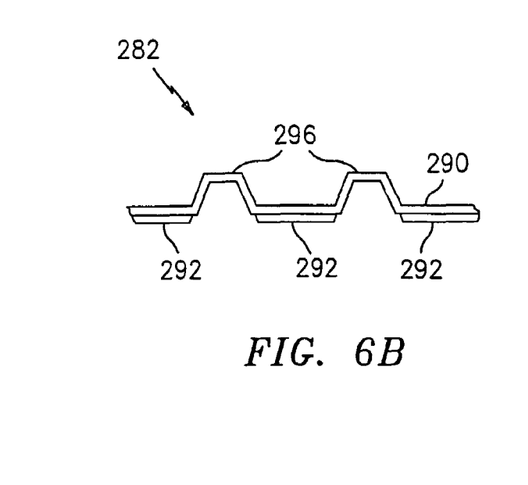
FIGS. 6B through 6E are side sectional views of a section of a pressure pad having frusto-pyramidically shaped dimples and having elastomeric materials disposed thereat.
Figure 6C:
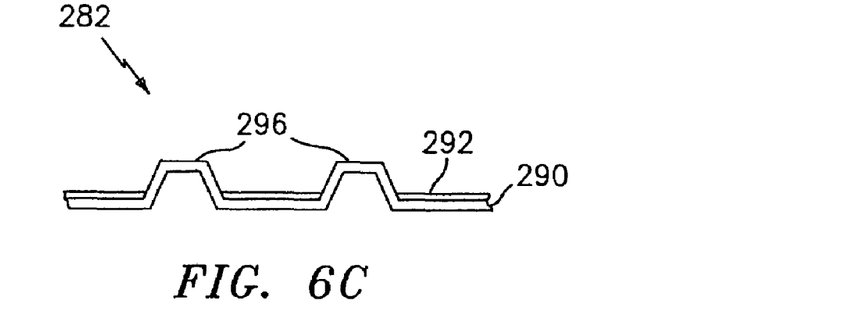
Figure 6D:
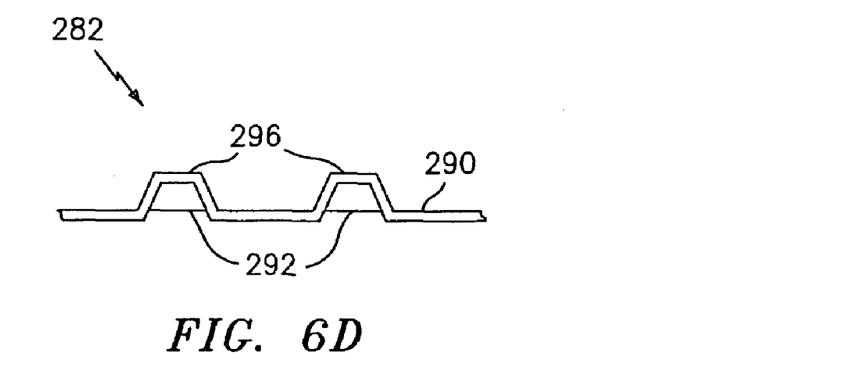
Figure 6E:
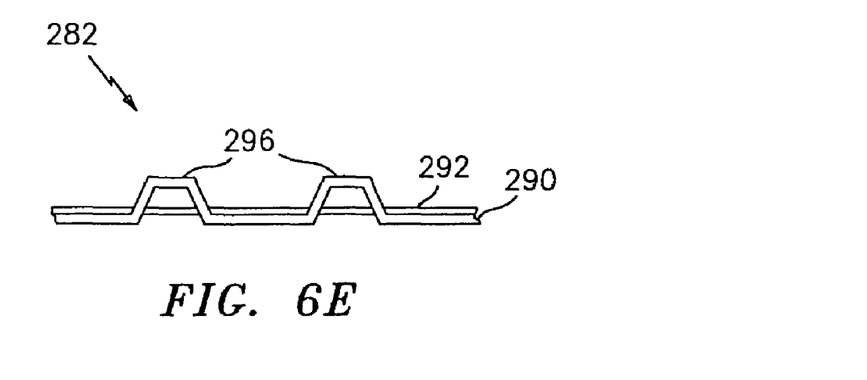

Referring to FIGS. 6A through 6E, another exemplary embodiment of a pressure pad is shown at 282. Pressure pad 282 comprises a plurality of dimples 296 formed on an electrically conductive sheet 290. Dimples 296 may be frusto-pyramidically shaped, as is shown, or they may be similarly configured, e.g, rectilinearly-shaped, or configured to resemble any other shape capable of being resiliently deformed under pressure such that electrical contact can be maintained between sheet 290 and an adjacently positioned surface. Openings (not shown) may also be disposed in dimples 296 in a manner similar to that described above with reference to FIG. 5 to enable elastomeric material to be threaded therethrough. An elastomeric material, shown at 292 in FIG. 6B, may be disposed adjacent to sheet 290 to provide resiliency to sheet 290 in directions both normal to and along the face of pressure pad 282. The elastomeric material may be disposed on the surface of sheet 290 opposing the surface from which dimples 296 protrude, as is shown in FIG. 6B. Alternately, elastomeric material 292 may be disposed on the surface of sheet 290 adjacent dimples 296 as is shown in FIG. 6C, within the cavities defined by dimples 296 as is shown in FIG. 6D, or threaded through dimples 296 as is shown in FIG. 6E.

Figure 7:
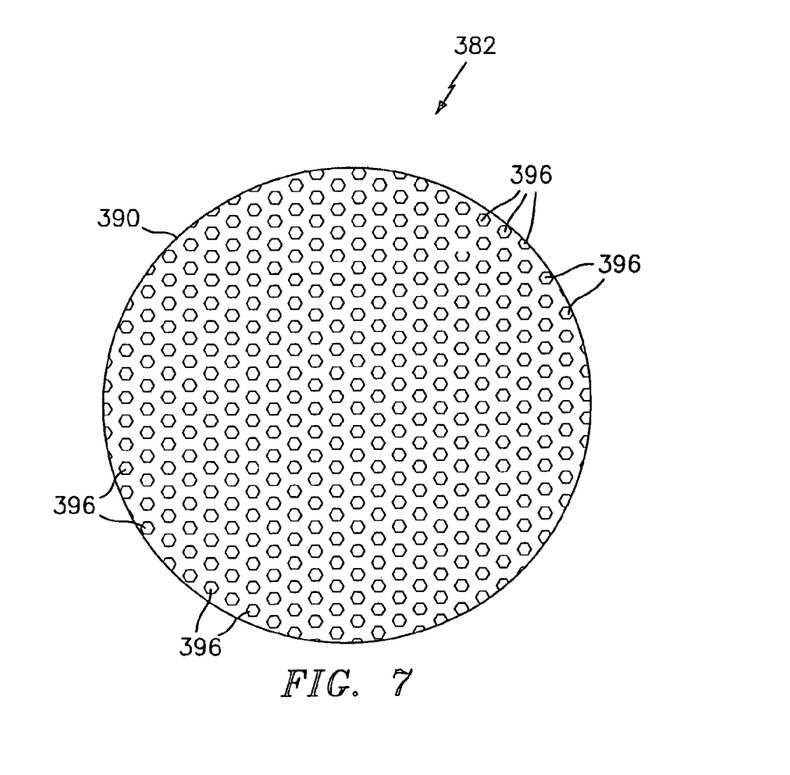
FIG. 7 is a plan view of a pressure pad having semi-spherical dimples.
Figure 8:
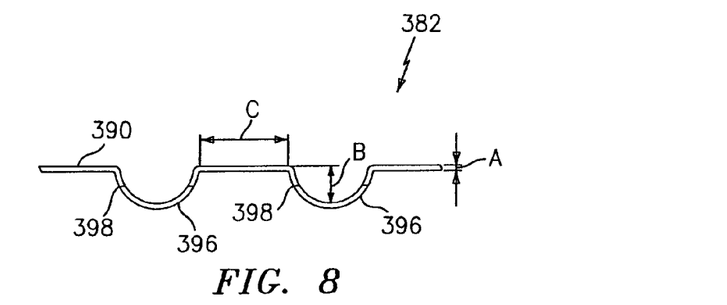
FIG. 8 is a side sectional view of a section of a pressure pad having semi-spherical dimples.
Figure 9:
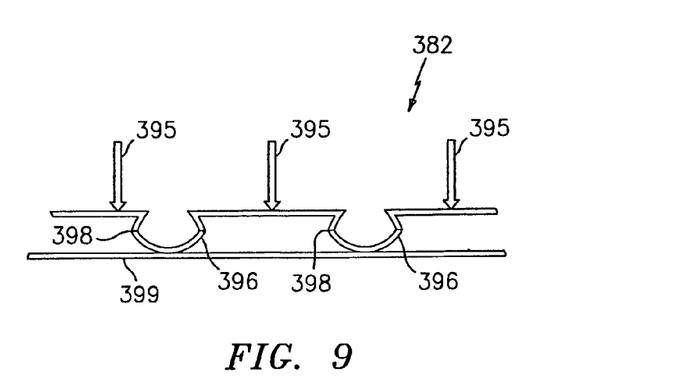
FIG. 9 is a side sectional view of a section of a pressure pad having semi-spherical dimples upon which a compressive force is exerted.

Referring now to FIGS. 7 through 9, another exemplary embodiment of a pressure pad comprising dimples is shown at 382. Dimples 396, which are semi-spherical in geometry, are stamped or otherwise disposed on an electrically conductive sheet 390. The arrangement of dimples 396 on sheet 390 imparts a resilience to pressure pad 382 that allows a highly predictable and substantially uniform spring rate to be realized, thereby allowing for the substantially uniform compression of the cell system components under pressure.

Dimples 396 themselves may be substantially incompressible or rigid, or they may be configured to collapse under pressure. FIG. 8, dimples 396 are shown in an uncompressed state. A stress line 398 or a series of stress points extends circumferentially about the cross section of each dimple 396. A thickness A of sheet 390, the number of dimples 396, a height B of each dimple 396, and a distance C between each dimple 396 and adjacent dimples are determined and optimized depending upon the material of construction of sheet 390 and the working pressure of the cell system into which pressure pad 382 is incorporated. The dimensions A, B, and C are each defined such that a spring rate of dimples 396 is within a preselected compression range. Upon a compressive force, shown by arrows 395 in FIG. 9, exerted on pressure pad 382 in a direction normal to sheet 390 when pressure pad 382 is disposed in a cell system such that dimples 396 engage and are supported by a surface 399 within the cell system, dimples 396 "collapse" at stress lines 398 to resemble mushroom-shaped elements.

Figure 10A:
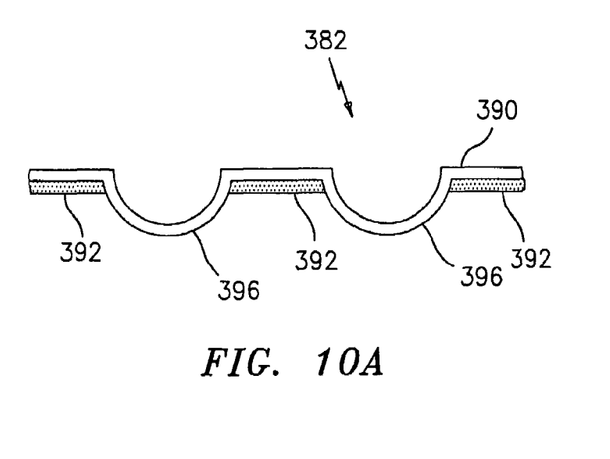
FIGS. 10A and 10B are side sectional views of a section of a pressure pad having semi-spherical dimples and an elastomeric member disposed thereon.
Figure 10B:
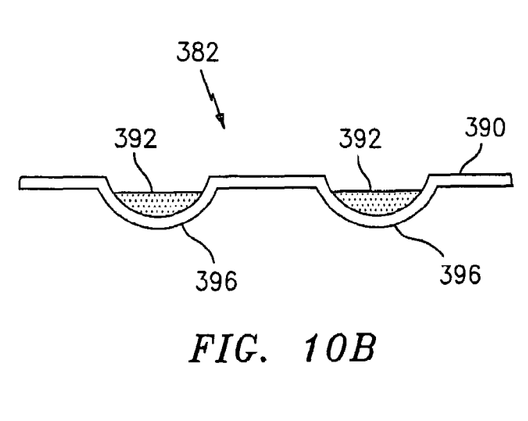

Any number of pressure pads 382 can be stacked to provide compression to the cell. In configurations where pressure pads 382 are stacked, dimples 396 may be slightly bulbous to prevent stacked pressure pads 382 from fitting together such that the dimples of one pressure pad are not matingly received in the cavities formed by the dimples of an adjacently positioned pressure pad. Compression of pressure pad 382 may be further facilitated by the disposing of an elastomeric member 392 on sheet 390 adjacent to dimples 396, as is shown in FIG. 10A. Alternately, compression of pressure pad 382 may be facilitated by the disposing of elastomeric member 392 on a reverse surface of sheet 390. As is shown in FIG. 10B, elastomeric members 392 are disposed within cavities formed by dimples 396. Elastomeric members may also be disposed both in the dimples and on either surface or both surfaces.

Where a plurality of layers of integrally formed electrically conductive and elastomeric material are used to define the pressure pad, the various layers can be configured to direct fluid flow. For example, the elastomeric and electrically conductive materials of each layer can be woven to impart a given porosity to the layer. The porosity of adjacent layers can be varied, i.e., in the form of a gradient, to allow control of the fluid communication between the layers. Such gradients not only improve fluid distribution to the membrane, but they also reduce the voltage required for the electrochemical reaction. They furthermore provide structural integrity to the MEA, thereby possibly eliminating (or substantially reducing) the need for a flow field support member.

Figure 11:
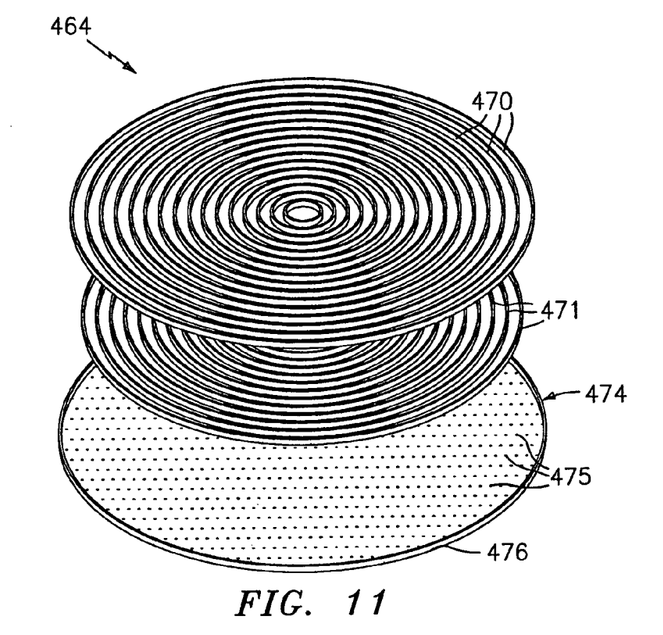
FIG. 11 is an exploded perspective view of a pressure pad having compressible electrically conductive members and partition members disposed on a pressure distribution plate.

In another exemplary embodiment of a pressure pad, shown at 464 in FIG. 11, the electrically conductive member itself can be configured to be compressible. The conductive member can be compressed without a separate compression member, e.g., without the need for an elastomeric material disposed at the conductive member. In such an embodiment, a pressure pad can be formed from a plurality of concentrically arranged conductive members configured to collapse upon themselves under a compressive force.

Pressure pad 464 comprises a plurality of collapsible conductive members 470 and a plurality of partition members 471 arranged in a concentric and alternating pattern. Each collapsible conductive member 470, as well as each partition member 471, is configured to form a loop or ring. Each loop varies in diameter, thereby enabling the concentric and alternating pattern to be defined. Partition members 471 maintain the overall shape of pressure pad 464 and prevent the individual collapsible conductive members 470 from nesting with each other. Partition members 471 are dimensioned relative to collapsible conductive members 470 in such a manner so as to allow for the deformation of collapsible conductive members 470 in a direction perpendicular to the direction of an applied force.

Typically, collapsible conductive members 470 and partition members 471 are supported by a pressure distribution plate 474. Pressure distribution plate 474 comprises a planar member upon which the arrangement of collapsible conductive members 470 and partition members 471 can be disposed. Openings 475 perforating the planar member allow fluid communication to be maintained across opposing surfaces thereof.

Pressure distribution plate 474 may further include a lip 476 or a similar feature to retain collapsible conductive members 470 and partition members 471 thereon, and which may facilitate the stacking of subsequent member/plate assemblies, thereby eliminating or reducing the number of flow field support members disposed in the cell stack.

Figure 12:
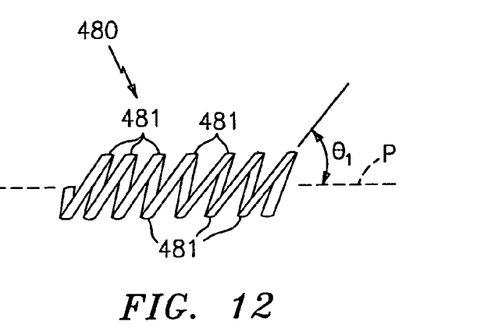
FIGS. 12 and 13 are side sectional views of a canted coil spring employable as a compressible electrically conductive member.
Figure 13:
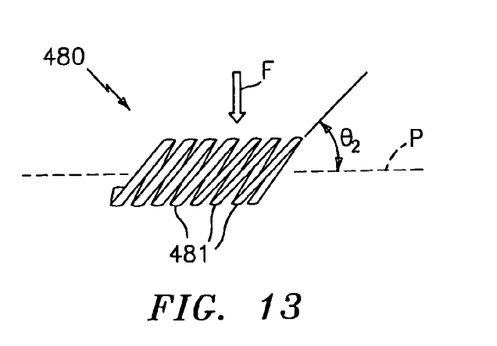

Referring now to FIGS. 12 and 13, an exemplary embodiment of a collapsible conductive member 470 incorporable into pressure pad 464 is shown. In FIG. 12, collapsible conductive member 470 comprises a coil spring 480. Coil spring 480 is canted such that each individual coil 481 is angled with respect to a perpendicularly applied force exerted on the cell into which coil spring 480 is incorporated. The canting of coil springs 480 enables coil springs 480 to be elastically deformed, which thereby allows each coil spring 480 to be compressed a considerable distance without experiencing a significant corresponding change in resiliency. In FIG. 12, canted coil spring 480 is shown at rest (having no force acting thereon). Each coil 481 of coil spring 480 is slanted away from a general plane P of coil spring 480 at an angle $\theta_1$. In FIG. 13, a force F acting on each coil 481 compresses coil spring 480 such that coils 481 are slanted relative to general plane P of coil spring 480 at an angle $\theta_2$, which is less than angel $\theta_1$. Such a feature of coil springs 480 allows for nearly constant pressure to be exerted by the pressure pad over a relatively large compression distance.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A resilient pressure pad for an electrochemical cell, the pressure pad comprising:
    an electrically conductive planar member;
    a plurality of electrically conductive dimples disposed at a first surface of the planar member, the dimples being configured to impart resilience to the pressure pad in response to pressure variations within the cell; and
    an elastomeric member threaded through the dimples.

2. The pressure pad of claim 1 wherein the dimples are semi-spherical in geometry.

3. The pressure pad of claim 2 wherein the dimples each comprise a stress point, the stress point defining a point at which the dimples collapse under pressure.

4. The pressure pad of claim 1 wherein the dimples are frusto-pyramidical in geometry.

5. The pressure pad of claim 1 wherein the elastomeric member is a fluorosilicone, a fluoroelastomer, or a combination thereof.

6. The pressure pad of claim 1 wherein the electrically conductive planar member is copper, silver, gold, chromium, zirconium, tantalum, titanium, niobium, iron, nickel, cobalt, hafnium, tungsten, alloys thereof, electrically conductive carbon, electrically conductive polymer, or combinations of the foregoing materials.

7. The pressure pad of claim 1 wherein the pressure pad is disposed in fluid communication with an electrode in the electrochemical cell.

8. A resilient pressure pad disposed in fluid communication with an electrode in an electrochemical cell, the pressure pad comprising:
   an electrically conductive corrugated member; and
   an elastomeric member threaded transversely through raised portions in the corrugated member.

9. The pressure pad of claim 8 wherein the elastomeric member is electrically conductive.

10. The pressure pad of claim 8 wherein the electrically conductive corrugated member is copper, silver, gold, chromium, zirconium, tantalum, titanium, niobium, iron, nickel, cobalt, hafnium, tungsten, alloys thereof, electrically conductive carbon, an electrically conductive polymeric material, or a combination of the foregoing materials.

11. The pressure pad of claim 8 wherein the elastomeric member is a fluorosilicone, a fluoroelastomer, or a combination thereof.

* * * * *